(12) United States Patent
Ochi et al.

(10) Patent No.: US 11,260,593 B2
(45) Date of Patent: *Mar. 1, 2022

(54) SHAPING DEVICE AND SHAPING METHOD

(71) Applicant: MIMAKI ENGINEERING CO., LTD., Nagano (JP)

(72) Inventors: Kazuhiro Ochi, Nagano (JP); Masakatsu Okawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 462 days.

This patent is subject to a terminal disclaimer.

(21) Appl. No.: 15/702,738

(22) Filed: Sep. 12, 2017

(65) Prior Publication Data
US 2018/0071983 A1 Mar. 15, 2018

(30) Foreign Application Priority Data
Sep. 14, 2016 (JP) .............................. JP2016-179387

(51) Int. Cl.
*B33Y 50/02* (2015.01)
*B29C 64/393* (2017.01)
(Continued)

(52) U.S. Cl.
CPC ........ *B29C 64/264* (2017.08); *B29C 35/0805* (2013.01); *B29C 64/112* (2017.08);
(Continued)

(58) Field of Classification Search
None
See application file for complete search history.

(56) References Cited

U.S. PATENT DOCUMENTS 10,391,754 B2 * 8/2019 Hakkaku ................ B33Y 30/00
2005/0104241 A1 * 5/2005 Kritchman ............. B33Y 30/00
264/40.1
(Continued)

FOREIGN PATENT DOCUMENTS

JP 2013067120 4/2013
JP 2015071282 4/2015
(Continued)

OTHER PUBLICATIONS

"Office Action of Japan Counterpart Application", dated Mar. 3, 2020, with English translation thereof, pp. 1-13.

*Primary Examiner* — Armand Melendez
(74) *Attorney, Agent, or Firm* — JCIPRNET

(57) ABSTRACT

A shaping device that shapes a 3D object, including: a discharging head that discharges an ultraviolet curing type ink as a material of shaping; an ultraviolet light source; a main scanning driving unit; a sub-scanning driving unit, a flattening roller serving as a flattening unit, and a controller, where the controller causes the inkjet head to carry out the main scanning operation for plural times with respect to each position in a plane orthogonal to a layering direction, and when an integrated light amount of the ultraviolet ray irradiated per unit area in one main scanning operation is defined as a unit area light amount, the unit area light amount in some main scanning operations is made smaller than the unit area light amount in the other main scanning operations in the plural times of main scanning operations carried out with respect to each position.

14 Claims, 4 Drawing Sheets

(51) Int. Cl.
*B29C 64/264* (2017.01)
*B33Y 10/00* (2015.01)
*B33Y 30/00* (2015.01)
*B29C 64/209* (2017.01)
*B29C 35/08* (2006.01)
*B29C 64/112* (2017.01)

(52) U.S. Cl.
CPC .......... *B29C 64/209* (2017.08); *B29C 64/393* (2017.08); *B33Y 10/00* (2014.12); *B33Y 30/00* (2014.12); *B33Y 50/02* (2014.12); *B29C 2035/0827* (2013.01)

(56) References Cited

U.S. PATENT DOCUMENTS

| | | | | |
|---|---|---|---|---|
| 2017/0173883 | A1* | 6/2017 | Gray | B23K 26/103 |
| 2018/0169935 | A1* | 6/2018 | Hakkaku | B29C 64/112 |
| 2019/0143588 | A1* | 5/2019 | Hakkaku | B29C 64/112 425/162 |
| 2019/0217544 | A1* | 7/2019 | Harayama | B29C 64/112 |

FOREIGN PATENT DOCUMENTS

| | | |
|---|---|---|
| JP | 2015202689 | 11/2015 |
| JP | 2016147458 | 8/2016 |

* cited by examiner

SHAPING DEVICE AND SHAPING METHOD

CROSS REFERENCE TO RELATED APPLICATIONS

This application claims the priority benefit of Japanese Patent Application No. 2016-179387, filed on Sep. 14, 2016. The entirety of the above-mentioned patent application is hereby incorporated by reference herein and made a part of this specification.

TECHNICAL FIELD

The present disclosure relates to a shaping device and a shaping method.

DESCRIPTION OF THE BACKGROUND ART

A shaping device (a three-dimensional printer (3D printer)) that shapes a three-dimensional object (3D object) using a discharging head such as an inkjet head is conventionally known (see e.g., Japanese Unexamined Patent Publication No. 2015-71282).

In such a shaping device, for example, the 3D object is shaped through a layering and shaping method by overlapping a plurality of layers of ink formed by the inkjet head using ink for the material of shaping.

SUMMARY

When shaping is carried out in such shaping device described above, consideration is made to using, for example, an ultraviolet curing type ink that cures by irradiation of an ultraviolet ray for the material of shaping. Furthermore, in order to form each layer to layer at high precision, consideration is made to flattening the layer using a flattening unit such as a roller before the ultraviolet curing type ink is cured. In this case, the position of the flattening unit in a layering direction is usually adjusted so as not to make contact with the already cured ultraviolet curing type ink and to make contact with only the uncured ultraviolet curing type ink.

More specifically, for example, when a shaping device that carries out shaping by causing the inkjet head, and the like used as a discharging head that discharges the material of shaping to carry out a main scanning operation (scan operation) is used, the position of the flattening unit in the layering direction is adjusted so that the 3D object being shaped and the flattening unit come into contact only at the time of a main scanning operation of a specific turn to carry out the flattening in units of layers. In this case, at the time of the main scanning operation other than the main scanning operation for carrying out flattening, the position of the flattening unit in the layering direction is adjusted so that the 3D object being shaped and the flattening unit do not come into contact.

However, for example, when shaping is carried out using the ultraviolet curing type ink, a thickness of ink discharged in one main scanning operation becomes extremely small. Thus, even if the position of the flattening unit in the layering direction is set as described above in design, for example, the cured ultraviolet curing type ink and the flattening unit may come into contact. When such contact occurs, this may cause lowering in the precision of shaping. For example, consideration is made that such contact may cause the cured ultraviolet curing type ink to be scraped by the flattening unit, thus producing residue, and the like. When residue is produced, for example, the residue and the like may attach to the 3D object being shaped, and thus lowering the precision of shaping. Furthermore, the residue, and the like may become powder dust, and deteriorate the environment of shaping. Moreover, the flattening unit may vibrate by such contact, and thus influencing the operation of flattening. The present disclosure thus provides a shaping device and a shaping method that can solve the problem described above.

Means for Solving the Problem

The inventors of the present application reviewed a cause in which an unintended contact between the cured ultraviolet curing type ink and the flattening unit occurs. Focus is made on an overlapping manner of dots of the ultraviolet curing type ink formed in each main scanning operation, in which the dots are not necessarily overlapped in an orderly manner as seen microscopically but rather a difference of a certain extent is created in the overlapping manner depending on the position in a surface-to-be-shaped of the 3D object due to various factors such as variation in the condition of discharging. Furthermore, the inventors found out that due to such difference, a portion where a height in the layering direction is locally high is formed, and the cured ultraviolet curing type ink and the flattening unit are locally brought into contact.

Through further intensive research, the inventors found out that the problem can be appropriately solved by differing the manner of curing the ultraviolet curing type ink in some main scanning operations from other main scanning operations. In this case, for example, consideration is made to reducing the irradiation amount of the ultraviolet ray in some main scanning operations, so that the ultraviolet curing type ink is not completely cured.

More specifically, for example, consideration is made to not completely curing the ink, but to curing the ink to such an extent that deformation is possible when the ink is brought into contact with the flattening unit at the time of the main scanning operation immediately before carrying out flattening. According to such configuration, for example, even if the ink discharged in the main scanning operation immediately before carrying out the flattening is brought into contact with the flattening unit, it is possible to appropriately prevent the cured ultraviolet curing type ink from being scraped off and the residue and the like from being produced. In this case, for example, the flattening unit can also be appropriately prevented from vibrating by contact, and the like.

Furthermore, consideration is also made to preventing a portion in which the height in the layering direction becomes locally high from being formed, and the like, for example, by not completely curing the ultraviolet curing type ink in some main scanning operations. In this case, for example, consideration is made to not completely curing the ink but to having the ink in a state with some fluidity at which the ink can move to a certain extent after landing in any of the few main scanning operations other than the main scanning operation for carrying out flattening (e.g., main scanning operation immediately after main scanning operation for carrying out flattening). In this case, consideration is also made to not carrying out the irradiation of the ultraviolet ray at the time of the main scanning operation in which the ink is not completely cured.

More specifically, in such configuration, for example, the dots of the ink formed in the relevant main scanning operation can be sufficiently flattened by leaving fluidity of the ink. Thus, a locally high position can be appropriately prevented from being formed. Furthermore, for example, in the main scanning operation carried out with a locally high position already formed, the ink that landed at the high position tends to easily move to a lower position by gravity if the ink is not completely cured. As a result, the amount of ink to be further overlapped on the locally high position can be reduced, and the state after the main scanning operation is carried out can be further flattened. Thus, according to such configuration, for example, a region of a height that comes into contact with the flattening unit is prevented from being easily formed, and the contact between the cured ultraviolet curing type ink and the flattening unit can be appropriately prevented.

Furthermore, the inventor of the present disclosure, through thorough researches, found the features necessary for obtaining such effects, and contrived the present disclosure. In order to solve the problem described above, the present disclosure provides a shaping device that shapes a 3D object, the shaping device including a discharging head that discharges an ultraviolet curing type ink, which cures according to irradiation of an ultraviolet ray, as a material of shaping; an ultraviolet light source that irradiates the ultraviolet ray for curing the ultraviolet curing type ink; a main scanning driving unit that causes the discharging head to carry out a main scanning operation of discharging the ultraviolet curing type ink while relatively moving with respect to the 3D object in a main scanning direction set in advance; a layering direction driving unit that relatively moves the discharging head with respect to the 3D object in a layering direction being a direction in which the ultraviolet curing type ink is layered; a flattening unit that flattens a layer formed with the ultraviolet curing type ink; and a controller that controls operations of the discharging head, the ultraviolet light source, the main scanning driving unit, the layering direction driving unit, and the flattening means to execute an operation of shaping carried out by layering the ultraviolet curing type ink in the layering direction; where the controller causes the discharging head to carry out the main scanning operation for plural times with respect to each position in a plane orthogonal to the layering direction; and when an integrated light amount of the ultraviolet ray irradiated from the ultraviolet light source per unit area in one main scanning operation with respect to a region to which the ultraviolet curing type ink is discharged is defined as a unit area light amount, the unit area light amount in some main scanning operations is made smaller than the unit area light amount in the other main scanning operations in the plural times of main scanning operations carried out with respect to each position.

Reducing the unit area light amount in the main scanning operation means, for example, making the ultraviolet ray irradiated to each position in the relevant main scanning operation weaker than in the other main scanning operations. Moreover, reducing the unit area light amount in the main scanning operation may be, for example, not irradiating the ultraviolet ray to each position in the relevant main scanning operation.

According to such configuration, for example, the ultraviolet curing type ink is not completely cured in some main scanning operations, so that the cured ultraviolet curing type ink and the flattening unit can be appropriately prevented from making contact, as described above. The 3D object thus, for example, can be more appropriately shaped at higher precision.

In such configuration, the shaping device, for example, shapes a 3D object through a layering and shaping method. Each layer layered in the layering and shaping method is formed through a multi-path method. In this case, forming the layer through the multi-path method means, for example, forming each layer through a plurality of main scanning operations. Furthermore, forming the layer through the plurality of main scanning operations means, for example, carrying out the plurality of main scanning operations with respect to each position of a surface-to-be-shaped of the 3D object in the operation of forming one layer.

Furthermore, in this case, consideration is made to making the unit area light amount in some main scanning operations smaller than the unit area light amount in other main scanning operations in the plurality of main scanning operations carried out to form one layer. In this case, the flattening unit, for example, flattens the layer at least in the last main scanning operation of the plurality of main scanning operations carried out to form each layer. Furthermore, the flattening unit, for example, flattens the layer by scraping off part of the discharged material during the main scanning operation for carrying out the flattening. According to such configuration, for example, the flattening in units of layers can be more appropriately carried out.

Furthermore, in this case, the unit area light amount is preferably made sufficiently large in at least the last main scanning operation of the plurality of main scanning operations carried out to form each layer. According to such configuration, for example, the layer after the flattening can be more reliably cured. Furthermore, in this case, for example, consideration is made to reducing the unit area light amount smaller than in the last main scanning operation in the main scanning operation second to last, which is the main scanning operation immediately before carrying out flattening. Moreover, in this case, for example, consideration is made to curing the ink to such an extent that deformation can occur when the ink is brought into contact with the flattening unit in the main scanning operation second to last. According to such configuration, for example, even if the ink is brought into contact with the flattening unit, it is possible to appropriately prevent the cured ink from being scraped off and residues and the like from being produced. Furthermore, the vibration of the flattening unit by contact with the ink, and the like can be appropriately prevented.

Furthermore, for example, consideration is made to making the unit area light amount in the first main scanning operation smaller than in the last main scanning operation in the plurality of main scanning operations carried out to form the respective layers. In this case, the first main scanning operation is, for example, the main scanning operation immediately after the last main scanning operation for carrying out flattening when a layer below is formed. Furthermore, in this case, for example, consideration is made to having the ink to be landed in the first main scanning operation in a state with some fluidity at which the ink can move to a certain extent after landing. More specifically, in this case, the unit area light amount may be reduced by not irradiating the ultraviolet ray at the time of the first main scanning operation. Thus, according to such configuration, for example, formation of a region that becomes locally high in the layer of ink can be appropriately suppressed. Furthermore, for example, the cured ultraviolet curing type ink and the flattening unit can be appropriately prevented from making contact, and the 3D object can be more appropriately shaped at higher precision.

Furthermore, the main scanning operation for reducing the unit area light amount may be the main scanning operation other than immediately before and immediately after the main scanning operation for carrying out flattening. In this case, the main scanning operation for reducing the unit area light amount is preferably selected from the main scanning operations other than the main scanning operation for carrying out flattening.

If the number of main scanning operations for reducing the unit area light amount is too many, the curing of ink may become insufficient in the 3D object as a whole. Thus, consideration is made to having the proportion of the main scanning operation for reducing the unit area light amount to, for example, only one main scanning operation of the plurality of main scanning operations carried out to form the respective layers. According to such configuration, for example, the cured ultraviolet curing type ink and the flattening unit can be appropriately prevented from making contact while preventing the curing of ink from being insufficient in the 3D object as a whole.

Furthermore, consideration is also made to using a shaping method, and the like having the feature similar to the above for the configuration of the present disclosure. In this case as well, for example, effects similar to the above can be obtained.

According to the present disclosure, for example, the 3D object can be more appropriately shaped at high precision.

BRIEF DESCRIPTION OF THE DRAWINGS

FIG. 1A shows one example of a configuration of a main part of the shaping device 10. FIG. 1B shows one example of a configuration of a head unit 12. FIG. 1C is a view showing one example of a configuration of a 3D object 50 shaped by the shaping device 10 in the present example together with a support layer 52.

FIG. 2A is a view showing one example of a region set in an inkjet head 102 in correspondence with each path. FIG. 2B is a view showing an operation of forming one layer of ink through the multi-path method. FIG. 2C is a view showing a state of flattening the layer of ink. FIG. 2D is a view showing a state in which a shift in height occurred in the layer of ink being formed.

FIG. 3A shows one example of a setting of the light amount of the ultraviolet ray irradiated in each path in the present example. FIG. 3B is a view showing a variant in a manner of irradiating the ultraviolet ray. FIG. 3C schematically shows one example of a state of a dot 302 of an ink formed in each path when a unit area light amount in the first path is reduced. FIG. 3D is a view describing a configuration of the head unit 12 when the position of an ultraviolet light source 104 and the position of the inkjet head 102 are shifted in a sub-scanning direction.

FIG. 4A is a view describing a position of the inkjet head 102 in each path in the small pitch multi-path method. FIG. 4B is a view describing a manner of irradiating the ultraviolet ray when shaping is carried out in the small pitch multi-path method.

DETAILED DESCRIPTION OF EMBODIMENTS

Figure 1A:
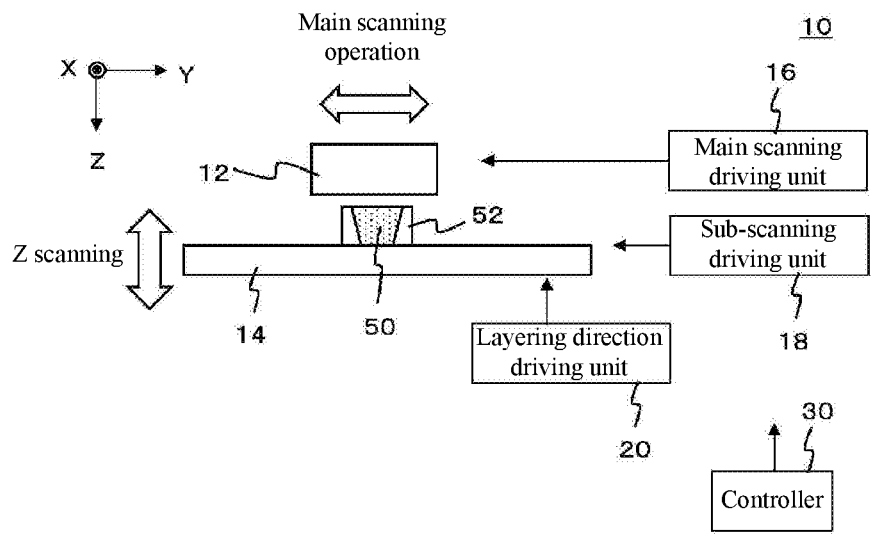
FIGS. 1A to 1C are views showing one example of a shaping device 10 according to one embodiment of the present disclosure.
Figure 1B:
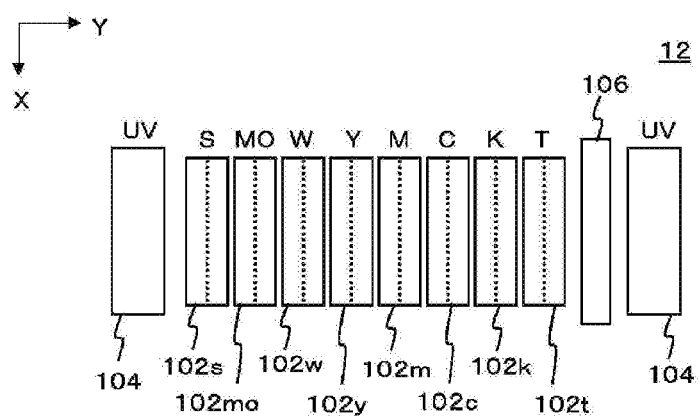
Figure 1C:
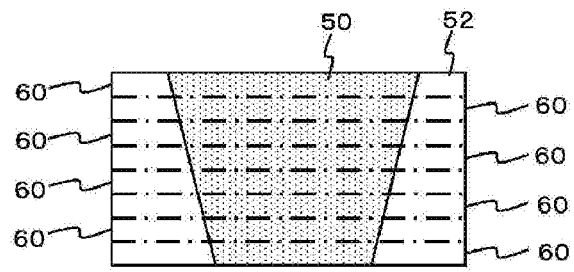

Hereinafter, an embodiment according to the present disclosure will be described with reference to the drawings. FIGS. 1A to 1C show one example of a shaping device 10 according to one embodiment of the present disclosure. FIG. 1A shows one example of a configuration of a main part of the shaping device 10.

Excluding the points described below, the shaping device 10 may have a configuration same as or similar to that of the known shaping device. More specifically, excluding the points described below, the shaping device 10 may have a configuration same as or similar to, for example, that of the known shaping device that carries out shaping by discharging a liquid droplet to become a material of a 3D object 50 using an inkjet head. Other than the illustrated configuration, for example, the shaping device 10 may also include various types of configurations necessary for shaping, coloring, and the like of the 3D object 50.

In the present example, the shaping device 10 is a device that shapes the 3D object 50 through a layering and shaping method. In this case, the layering and shaping method is, for example, a method of shaping the 3D object 50 by layering a plurality of layers formed with a material of shaping. The 3D object 50 is, for example, a stereoscopic three-dimensional structural object. In the present example, the shaping device 10 includes a head unit 12, a shaping table 14, a main scanning driving unit 16, a sub-scanning driving unit 18, a layering direction driving unit 20, and a controller 30.

The head unit 12 is a portion that discharges the liquid droplet (ink droplet) of an ink that becomes the material of the 3D object 50, and discharges ink, which cures according to a predetermined condition, and cures the ink to form each layer constituting the 3D object 50 in an overlapping manner. Furthermore, in the present example, an ultraviolet curing type ink, which cures by irradiation of an ultraviolet ray, is used for the ink. In this case, the ink is, for example, a liquid discharged from the inkjet head. The inkjet head is, for example, a discharging head that discharges the ink droplet through an inkjet method.

Furthermore, in the present example, the head unit 12 includes at least a plurality of inkjet heads, and an ultraviolet light source. Furthermore, the head unit 12 further discharges the material of a support layer 52 in addition to the material of the 3D object 50. In this case, the support layer 52 is, for example, a layered structural object that supports the 3D object 50 by surrounding the outer periphery of the 3D object 50 being shaped. The support layer 52 is formed, as necessary, during the shaping of the 3D object 50, and removed after the shaping is completed. A more specific configuration of the head unit 12 will be described in detail later.

The shaping table 14 is a table-shaped member that supports the 3D object 50 being shaped and is arranged at a position facing the inkjet head in the head unit 12, where the 3D object 50 being shaped is mounted on an upper surface thereof. Furthermore, in the present example, the shaping table 14 has a configuration in which at least the upper surface is movable in a layering direction, where at least the upper surface moves in accordance with the progress in the shaping of the 3D object 50 by being driven by the layering direction driving unit 20. In this case, the layer direction is, for example, a direction in which the material of shaping is layered in the layering and shaping method. More specifically, in the present example, the layering direction is a direction (Z direction in the figure) orthogonal to a main scanning direction (Y direction in the figure) and a sub-scanning direction (X direction in the figure) set in advance in the shaping device 10.

The main scanning driving unit 16 is a driving unit that causes the head unit 12 to carry out the main scanning operation (Y scanning). In this case, causing the head unit 12 to carry out the main scanning operation means, for example, causing the inkjet head of the head unit 12 to carry out the main scanning operation. Furthermore, the main scanning operation is, for example, an operation of discharging the ink, which is the material of shaping, while moving in the main scanning direction.

In the present example, the main scanning driving unit 16 causes the head unit 12 to carry out the main scanning operation by fixing the position of the shaping table 14 in the main scanning direction and moving the head unit 12 side. The movement of the head unit 12 in the main scanning operation may be a relative movement with respect to the 3D object 50. Thus, in a variant of the configuration of the shaping device 10, for example, the 3D object 50 side may be moved by fixing the position of the head unit 12 and, for example, moving the shaping table 14.

At the time of the main scanning operation of the present example, the main scanning driving unit 16 further carries out the drive of the ultraviolet light source in the head unit 12. More specifically, the main scanning driving unit 16, for example, turns ON the ultraviolet light source at the time of the main scanning operation to cure the ink landed on a surface-to-be-shaped of the 3D object 50. The surface-to-be-shaped of the 3D object 50 refers to, for example, a surface on which a next layer of ink is formed by the head unit 12.

The sub-scanning driving unit 18 is a driving unit that causes the head unit 12 to carry out a sub-scanning operation (X scanning). In this case, causing the head unit 12 to carry out the sub-scanning operation means, for example, causing the inkjet head of the head unit 12 to carry out the sub-scanning operation. The sub-scanning operation is, for example, an operation of relatively moving with respect to the shaping table 14 in the sub-scanning direction orthogonal to the main scanning direction. More specifically, the sub-scanning operation is, for example, an operation of relatively moving with respect to the shaping table 14 in the sub-scanning direction by a feeding amount set in advance.

Furthermore, in the present example, the sub-scanning driving unit 18 causes the head unit 12 to carry out the sub-scanning operation between the main scanning operations. In this case, the sub-scanning driving unit 18, for example, causes the head unit 12 to carry out the sub-scanning operation by fixing the position of the head unit 12 in the sub-scanning direction and moving the shaping table 14. Furthermore, the sub-scanning driving unit 18 may cause the head unit 12 to carry out the sub-scanning operation by fixing the position of the shaping table 14 in the sub-scanning direction and moving the head unit 12.

The layering direction driving unit 20 is a driving unit of moving at least one of the head unit 12 or the shaping table 14 in the layering direction (Z direction). In this case, moving the head unit 12 in the layering direction, for example, means moving at least the inkjet head in the head unit 12 in the layering direction. Furthermore, moving the shaping table 14 in the layering direction means, for example, moving the position of at least the upper surface in the shaping table 14. Moreover, the layering direction driving unit 20 causes the inkjet head to carry out the scanning in the Z direction (Z scanning) by moving at least one of the head unit 12 or the shaping table 14 in the layering direction, and adjusts the relative position of the inkjet head with respect to the 3D object 50 being shaped in the layering direction. More specifically, in the present example, the layering direction driving unit 20, for example, fixes the position of the head unit 12 in the layering direction, and moves the shaping table 14. The layering direction driving unit 20 may fix the position of the shaping table 14 in the layering direction, and move the head unit 12.

The controller 30 is, for example, a CPU of the shaping device 10, and controls each unit of the shaping device 10 to cause the shaping device 10 to execute the shaping operation of the 3D object 50. In this case, the shaping operation of the 3D object 50 is, for example, the shaping operation carried out by layering the material of shaping in the layering direction. Furthermore, in this case, the controller 30 controls each unit of the shaping device 10 based on, for example, shape information, color image information, and the like of the 3D object 50 to be shaped. According to the present example, the 3D object 50 can be appropriately shaped.

Next, a more specific configuration of the head unit 12 will be described. FIG. 1B shows one example of a configuration of the head unit 12. In the present example, the head unit 12 includes a plurality of inkjet heads. Each inkjet head includes a nozzle row in which a plurality of nozzles are lined in a predetermined nozzle row direction on a surface facing the shaping table 14. Furthermore, the shaping device 10 shapes the 3D object 50 by discharging the material from the plurality of nozzle rows in the head unit 12.

More specifically, in the present example, the nozzle row direction is a direction parallel to the sub-scanning direction. Furthermore, the head unit 12 includes a plurality of inkjet heads, a plurality of ultraviolet light sources 104, and a flattening roller 106. As shown in FIG. 1B, the plurality of inkjet heads include an inkjet head 102s, an inkjet head 102mo, an inkjet head 102w, an inkjet head 102y, an inkjet head 102m, an inkjet head 102c, an inkjet head 102k, and an inkjet head 102t. Such plurality of inkjet heads are, for example, arranged in the main scanning direction with the positions in the sub-scanning direction aligned.

The inkjet head 102s is an inkjet head that discharges the material of the support layer 52. In the present example, an ultraviolet curing type ink, in which a cure degree by the ultraviolet ray is weaker than that of the material of the 3D object 50, is used for the material of the support layer 52. Thus, the inkjet head 102s discharges the ultraviolet curing type ink to become the material of the support layer 52 from each nozzle in the nozzle row. A water soluble material that can be dissolved in water after the shaping of the 3D object 50 is preferably used for the material of the support layer 52. Furthermore, a known material for the support layer, for example, can be suitably used for the material of the support layer 52.

The inkjet head 102mo is an inkjet head that discharges a shaping material ink (Mo ink), and discharges the shaping material ink from each nozzle in the nozzle row. In this case, the shaping material ink is, for example, a shaping dedicated ink used for the shaping of the interior (interior region) of the 3D object 50.

The interior of the 3D object 50 is not limited to being formed with the shaping material ink, and may be formed by further using an ink of another color. Furthermore, for example, consideration is also made to forming the interior of the 3D object 50 with only the ink of another color (e.g., white ink, etc.) without using the shaping material ink. In this case, the inkjet head 102mo may be omitted in the head unit 12.

The inkjet head 102w is an inkjet head that discharges a white (W) ink, and discharges the white ink from each nozzle in the nozzle row. In the present example, the white ink is an example of a material having light reflecting property, and is, for example, used in the case of forming a region (light reflecting region) having a property of reflecting light in the 3D object 50. The light reflecting region, for example, reflects the light entering from outside the 3D object 50 when coloring in a full color representation by the subtractive color mixing method is carried out on the surface of the 3D object 50.

The inkjet head 102y, the inkjet head 102m, the inkjet head 102c, and the inkjet head 102k (hereinafter referred to as inkjet heads 102y to 102k) are inkjet heads for coloring used at the time of shaping of the colored 3D object 50, and respectively discharges the respective ink of the inks (decoration inks) of plural colors used for coloring from each nozzle in the nozzle row. More specifically, the inkjet head 102y discharges a yellow (Y) ink. The inkjet head 102m discharges a magenta (M) ink. The inkjet head 102c discharges a cyan (C) ink. The inkjet head 102k discharges a black (K) ink. In this case, each color of YMCK is an example of a process color used for the color representation. Furthermore, the inkjet head 102t is an inkjet head that discharges a clear ink, and discharges the clear ink from each nozzle in the nozzle row. The clear ink is, for example, an ink of a clear color being a colorless transparent color (T).

The plurality of ultraviolet light sources 104 are light sources (UV light sources) for curing the ink, and generate the ultraviolet ray for curing the ultraviolet curing type ink. Furthermore, in the present example, each of the plurality of ultraviolet light sources 104 is arranged at each of one end side and another end side in the main scanning direction in the head unit 12 so as to sandwich the arrangement of the inkjet heads therebetween. An UVLED (ultraviolet LED), and the like, for example, can be suitably used for the ultraviolet light source 104. Furthermore, consideration is also made to using a metal halide lamp, a mercury lamp, and the like for the ultraviolet light source 104.

The flattening roller 106 is a flattening unit that flattens the layer of ink formed during the shaping of the 3D object 50, and for example, at the time of the main scanning operation, comes into contact with the surface of the layer of ink and removes part of the ink, before being cured, to flatten the layer of ink. In this case, removing part of the ink before being cured means, for example, scraping off part of the ink before being cured by the rotation of the flattening roller 106.

The layer of ink configuring the 3D object 50 can be appropriately formed by using the head unit 12 having the configuration described above. Furthermore, the 3D object 50 can be appropriately shaped by forming the plurality of layers of ink in an overlapping manner.

A specific configuration of the head unit 12 is not limited to the configuration described above, and various modifications can be made. For example, in addition to the inkjet heads 102y to 102k, the head unit 12 may further include inkjet heads for colors such as a light color of each color, R (red), G (green), B (blue), and orange, for the inkjet heads for coloring. Furthermore, the manner of arranging the plurality of inkjet heads in the head unit 12 can also be variously modified. For example, the positions in the sub-scanning direction of some inkjet heads may be shifted from the other inkjet heads.

Furthermore, as shown in the figure, in the present example, the head unit 12 includes the flattening roller 106 only on one side in the arrangement of the inkjet heads 102s to 102t. In this case, the flattening roller 106 flattens the layer of ink, for example, only at the time of the main scanning operation in which the flattening roller 106 moves on the back side of the inkjet heads 102s to 102t. More specifically, in the present example, the main scanning driving unit 16 causes the head unit 12 to carry out reciprocate main scanning operation. In this case, causing the head unit to carry out the reciprocate main scanning operation means causing the head unit 12 to carry out a forward main scanning operation in which the head unit 12 is moved in one way in the main scanning direction, and a backward main scanning operation in which the head unit 12 is moved in the other way. Moreover, in this case, the flattening roller 106 flattens the layer of ink at the time of either the forward or backward main scanning operation. Furthermore, in this case, the flattening roller 106 carries out the flattening of the layer, for example, by scraping off part of the discharged ink during the main scanning operation of carrying out the flattening. In this case, the layer of ink may be flattened only at the time of some main scanning operations according to the height of ink to be layered.

Next, an operation of shaping the 3D object 50 in the present example will be described in further detail. FIG. 1C is a view showing one example of a configuration of the 3D object 50 shaped by the shaping device 10 in the present example together with a support layer 52.

As described as well, in the present example, the shaping device 10 shapes the 3D object 50 through the layering and shaping method by layering a plurality of layers 60 of ink formed with ink, which is the material of shaping. Furthermore, in this case, the layer 60 including a portion corresponding to each region of the 3D object 50 and the support layer 52 is formed using the plurality of inkjet heads 102s to 102t in the head unit 12.

In FIG. 1C, the configurations of the 3D object 50 and the support layer 52 are schematically shown with the number of layers 60 configuring the 3D object 50 and the support layer 52 reduced for the sake of convenience of illustration. In the actual configuration, the shaping device 10, for example, forms the 3D object 50 and the support layer 52 by overlapping a great number of thin layers 60 having a thickness of about smaller than or equal to 100 μm. In this case, the thickness of the layer 60 is the thickness in the layering direction. More specifically, the thickness of the respective layers 60 is, for example, about 10 to 100 μm, and preferably about 20 to 50 μm.

In this case, the layer 60 is a portion that configures the cross-section of the 3D object 50, and for example, is formed based on the slice data indicating the cross-sectional shape of the 3D object 50 to be shaped. Furthermore, in this case, one layer 60 is formed based on one piece of slice data. The respective layers 60 are formed based on the slice data different from each other.

At the time of forming the layer 60, the ink is discharged from the plurality of inkjet heads 102s to 102t in the head unit 12 to a discharging position of the ink set according to a resolution of shaping within a plane (within XY plane) parallel to the main scanning direction and the sub-scanning direction. Furthermore, in this case, the layer 60 can be considered as a portion formed, for example, by discharging a predetermined amount of ink to all the discharging positions in the cross-section of the 3D object 50. Discharging a predetermined amount of ink to all the discharging positions means, for example, discharging ink to the positions of all the points corresponding to the set resolution of shaping. Furthermore, in this case, a state in which the ink is not necessarily discharged to all the discharging positions but the ink is discharged to the positions of a preset proportion of all the discharging positions may be considered as a state in which the layer 60 is formed. In this case, the preset proportion is, for example, a proportion at which ink of a sufficient amount for filling a region for forming the layer 60 can be discharged.

In the present example, the shaping device 10 forms each layer 60 through a multi-path method. In this case, forming the layer 60 through the multi-path method means, for example, forming each layer 60 through a plurality of main scanning operations. Furthermore, forming the layer 60 through the plurality of main scanning operations means, for example, carrying out the plurality of main scanning operations with respect to each position of the surface-to-be-shaped of the 3D object 50 in the operation of forming one layer 60. In this case, the controller 30, for example, causes the head unit 12 to carry out the plurality of main scanning operations with respect to each position in the plane orthogonal to the layering direction.

Figure 2A:
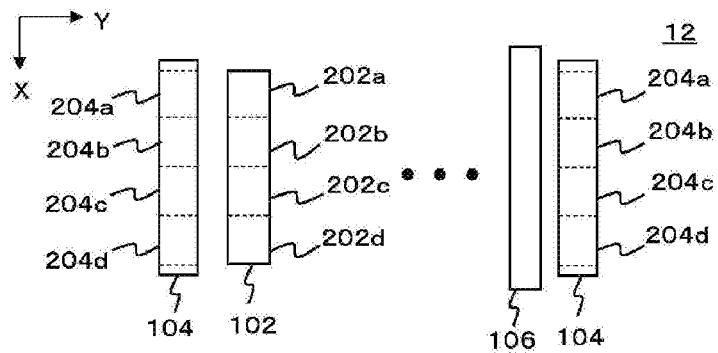
FIGS. 2A to 2D are views describing an operation of forming a layer of ink through a multi-path method in the present example.

FIGS. 2A to 2D are views describing the operation of forming the layer of ink through the multi-path method in the present example. FIG. 2A is a view showing one example of a region set in an inkjet head 102 in correspondence with each path. In this case, the region set in the inkjet head 102 in correspondence with each path is a region in which the nozzles for discharging the ink in each path are lined.

In FIG. 2A, a plurality of regions 202a to 202d set in the inkjet head 102 are shown for the case when the number of paths is four (four paths). Each of the plurality of regions 202a to 202d is a region corresponding to each of the first to fourth paths. In the present example, each of the plurality of regions 202a to 202d is a region in which the width in the sub-scanning direction is equal, and respectively includes the same number of nozzles.

In FIGS. 2A to 2D, the inkjet head 102 is an inkjet head shown representing the inkjet heads 102s to 102t in the head unit 12. In this case, the plurality of regions 202a to 202d are set in the respective inkjet heads 102s to 102t, similar to the illustrated inkjet head 102.

Furthermore, in the present example, a plurality of regions 204a to 204d are also set in the ultraviolet light source 104 in accordance with the regions 202a to 202d of the inkjet head 102, as shown in the figure. In this case, each of the plurality of regions 204a to 204d in the ultraviolet light source 104 is a region where the plurality of regions 202a to 202d in the inkjet head 102 and the positions in the sub-scanning direction overlap. Furthermore, in each main scanning operation, each of the plurality of regions 204a to 204d of the ultraviolet light source 104 irradiates the ultraviolet ray on the ink discharged from the nozzle arranged in each of the plurality of regions 202a to 202d of the inkjet head 102 and landed on the surface-to-be-shaped. Thus, each of the plurality of regions 204a to 204d can be considered as a region set in correspondence with each path in the ultraviolet light source 104.

As also described above in relation to FIGS. 1A to 1C, in the present example, the head unit 12 includes a plurality of ultraviolet light sources 104. Furthermore, each of the plurality of ultraviolet light sources 104 is arranged at each of one end side and another end side in the main scanning direction in the head unit 12 so as to sandwich the arrangement of the inkjet heads therebetween. Thus, in the present example, irradiating the ultraviolet ray from each of the plurality of regions 204a to 204d with respect to the ink landed at the time of the main scanning operation means irradiating the ultraviolet ray from each region of the ultraviolet light source 104 on the back side of the inkjet head in the moving direction at the time of the main scanning operation.

Furthermore, in the illustrated case, the width in the sub-scanning direction of the ultraviolet light source 104 is slightly greater than that of the inkjet head 102. According to such configuration, for example, the ultraviolet ray can be more reliably irradiated on the ink discharged from the nozzle at the end of the inkjet head 102. Moreover, in this case, the ultraviolet light source 104 further includes a region where the regions 202a to 202d of the inkjet head 102 and the positions in the sub-scanning direction do not overlap on the outer side of the regions 204a to 204d, as shown in the figure.

Figure 2B:
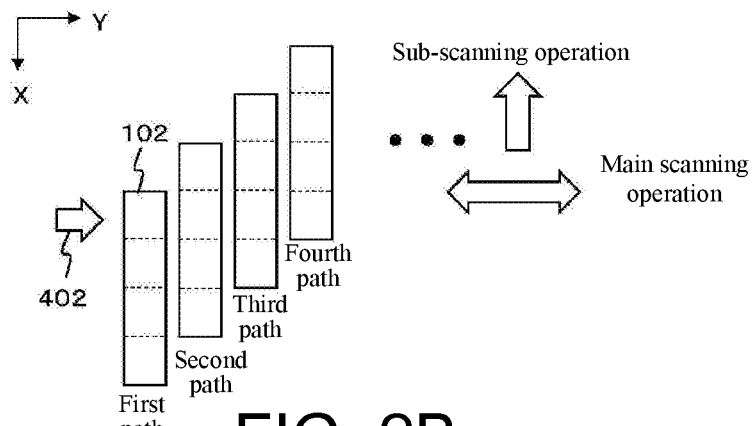

FIG. 2B is a view showing an operation of forming one layer of ink through the multi-path method, and shows an example of the position of the inkjet head 102 in the sub-scanning direction for the main scanning operation corresponding to each of the first to fourth paths (first to fourth paths) carried out with respect to the region indicated with an arrow 402. In this case, the region indicated with the arrow 402 is, for example, a region where the position indicated with the arrow 402 and the position in the sub-scanning direction overlap. Furthermore, in FIG. 2B, one example of the operation of the multi-path method is shown focusing on one inkjet head 102 for the sake of convenience of illustration and explanation.

When the layer of ink is formed through the multi-path method as shown in the figure, the sub-scanning driving unit 18 (see FIGS. 1A to 1C) in the shaping device 10 sets a feeding amount at the time of the sub-scanning operation to the width corresponding to the number of paths, for example, and causes the head unit 12 to carry out the sub-scanning operation. In this case, as for the feeding amount, the width corresponding to the number of paths is, for example, a width equal to a distance obtained by dividing the nozzle row length of the inkjet head 102 by the number of paths. The nozzle row length is, for example, the length of the nozzle row in the sub-scanning direction. The nozzle row length may be a substantive length of the nozzle row in the sub-scanning direction. More specifically, in the illustrated case, the feeding amount is ¼ of the nozzle row length. In this case, the sub-scanning driving unit 18 causes the head unit 12 to carry out the sub-scanning operation at the feeding amount corresponding to the path width between each main scanning operation. Moreover, the region in the inkjet head 102 facing each position of the 3D object 50 being shaped is thus sequentially changed.

As also described above, in the present example, the main scanning driving unit 16 (see FIGS. 1A to 1C) causes the head unit 12 to carry out the reciprocate main scanning operation. The flattening roller 106 (see FIGS. 1A to 1C) flattens the layer of ink at the time of either the forward or the backward main scanning operation. More specifically, in the case shown in FIG. 2B, the first path and the third path are the forward main scanning operations. The second path and the fourth path are the backward main scanning operations. The flattening roller 106 flattens the layer of ink at the time of the backward main scanning operation.

However, in the actual operation of shaping, the flattening roller 106 flattens the layer of ink only when the roller is brought into contact with the ink configuring the layer of ink. In design, the movement amount in the layering direction carried out by the layering direction driving unit 20 (see FIGS. 1A to 1C) is set such that, for example, only the ink discharged in the last path carried out in the formation of the respective layer of ink makes contact with the flattening roller 106.

More specifically, for example, the layering direction driving unit 20 increases the distance between the inkjet head and the shaping table 14 (see FIGS. 1A to 1C) by the thickness of one layer every time one layer of ink is formed. Thus, at the time of forming each layer, the ink discharged in the initial path usually is not brought into contact with the flattening roller 106. Furthermore, in this case, the movement amount in the layering direction is set such that the thickness of the layer is sufficiently thick and the ink and the flattening roller 106 are brought into contact at the time point the main scanning operation corresponding to the number of paths has been carried out. Thus, the flattening roller 106 flattens the layer at least in the last path of a plurality of paths (main scanning operations) carried out to form each layer. Moreover, in the present example, the movement amount in the layering direction carried out every time one layer of ink is formed is set such that, in design, the ink and the flattening roller 106 are brought into contact only in the last path. Thus, in the case of the operation shown in the figure, for example, only the ink discharged in the fourth path is brought into contact with the flattening roller 106 in design.

Figure 2C:
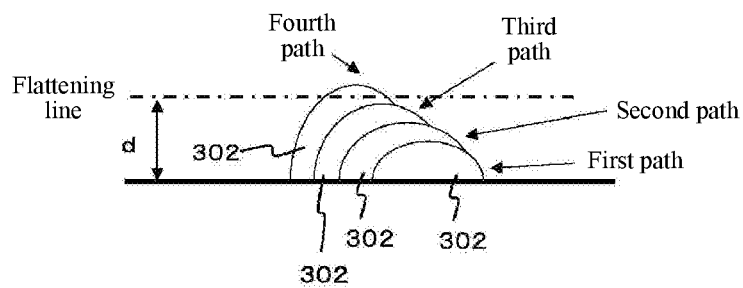

FIG. 2C is a view showing a state of flattening the layer of ink, and schematically shows an overlapping manner of dots 302 of the ink discharged to close positions in each path and one example of a height (flattening line) for carrying out the flattening. In this case, the flattening line is, for example, the position of the lower end of the flattening roller 106. The lower end of the flattening roller 106 is, for example, a portion closest to the shaping table 14 in the flattening roller 106.

At the time of shaping the 3D object, the time required for layering increases if the amount of ink discharged from each nozzle of the inkjet head is small. As a result, the shaping speed of the 3D object greatly lowers. Thus, at the time of shaping the 3D object, the amount of ink discharged from the nozzle in one discharge is usually made large to greater than or equal to a certain extent. More specifically, for example, consideration is made to setting the amount of ink discharged from the nozzle in one discharge such that a diameter (dot gain) of the dot 302 of the ink formed after landing in a plane orthogonal to the layering direction becomes greater than an interval (dot pitch) corresponding to the resolution of shaping. In this case, when the dot gain becomes large, overlapping occurs between the dots 302 formed at close positions in the other paths. Thus, in this case, the dot of the ink formed in each path is, for example, formed so as to be sequentially overlapped, as shown in the figure.

In this case, the flattening line is, for example, set in accordance with the design thickness of the layer of ink to be formed. More specifically, when the thickness of the layer of ink after the flattening is intended to be a predetermined thickness d, the head unit 12 is relatively moved with respect to the shaping table 14 so that the distance between the inkjet head and the shaping table 14 is increased by d by the layering direction driving unit 20 after forming the layer below. Thus, the height where the lower end of the flattening roller 106 passes in the head unit 12 is set to a position spaced apart by the distance d from the layer below. According to such configuration, for example, the flattening line can be appropriately set, as shown in the figure.

Furthermore, in this case, the height of the layer of ink being formed gradually becomes higher every time the ink is discharged in each path. In this case, assuming a height of the ink reached in each path when the flattening is not carried out, the thickness d of the layer of ink after the flattening is, in design, set so as to be higher than an assumed height reached before the path immediately before the last and lower than the assumed height reached after the completion of the last path. According to such configuration, for example, only the ink discharged in the last path can be brought into contact with the flattening roller 106 in terms of design. Therefore, according to such configuration, the flattening of the layer of ink can be appropriately carried out at least in terms of design.

However, when the position of the dot of each ink is locally seen in the actual shaping, the height of each position of the layer of ink does not necessarily coincide with the design height. Thus, when the shaping is carried out through the conventional method, for example, the height of the layer of ink may locally reach the flattening line at part of the layer of ink at a stage the path immediately before the last is carried out. Furthermore, in particular, when the shaping is carried out at high resolution, the dots of the ink are formed at high density, and thus such shift in height is considered to occur easily.

Figure 2D:
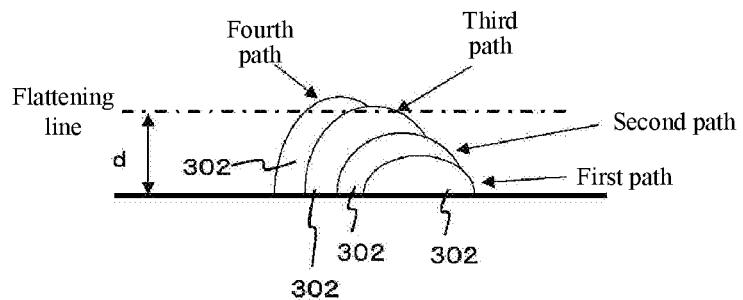

FIG. 2D is a view showing a state in which the shift in height occurred in the layer of ink being formed, and schematically shows one example of a state in which a shift occurred with the design height at any position by the third path before carrying out the main scanning operation of the fourth path for carrying out the flattening. More specifically, in the case shown in the figure, the height of the ink goes beyond the flattening line at a time point the third path is completed.

When the shaping is carried out through the multi-path method, the dot of the ink discharged in each path is usually irradiated with the ultraviolet ray and cured during the main scanning operation. Thus, if the shift in height occurs, an unintended contact of the cured ink dot and the flattening roller 106 occurs in the last path for carrying out the flattening. More specifically, in the case of the state shown in FIG. 2D, the dot 302 of the cured ink formed in the third path and the flattening roller 106 are brought into contact in the fourth path for carrying out the flattening.

When such contact occurs, the flattening of the layer of ink may not be appropriately carried out. More specifically, for example, the cured ink may be scraped off and extra scrape residue, and the like may be produced. In this case, the residue, and the like may attach to the 3D object being shaped, thus lowering the precision of shaping. Furthermore, the residue, and the like may become powder dust, and deteriorate the environment of shaping. Moreover, the flattening unit 106 may vibrate by such contact, thus influencing the operation of flattening. According to such results, it is sometimes difficult to appropriately carry out the flattening at high precision.

On the other hand, in the present example, the occurrence of such problem is suppressed by adjusting the setting of the light amount of the ultraviolet ray to be irradiated in each path. Hereinafter, a manner of irradiating the ultraviolet ray in each path in the present example will be described.

When shaping is carried out through the multi-path method of the conventional configuration, the light amount of the ultraviolet ray irradiated in each path is usually set the same in all the paths. In the present example, on the other hand, the light amount of the ultraviolet ray irradiated in each path is adjusted, as described above. More specifically, in this case, the light amount of the ultraviolet ray irradiated in some paths is differed from the light amount of the ultraviolet ray irradiated in the other paths.

In this case, the light amount is, for example, an integrated light amount of the ultraviolet ray irradiated on a region of a unit area in the plane orthogonal to the layering direction. Furthermore, the integrated light amount of the ultraviolet ray irradiated at the time of the main scanning operation is determined according to, for example, an irradiation intensity of the ultraviolet ray, a moving speed of the ultraviolet light source 104 at the time of the main scanning operation, and the like. The moving speed of the ultraviolet light source 104 at the time of the main scanning operation is usually a constant speed set in advance. Thus, the light amount of the ultraviolet ray irradiated in each path changes according to the irradiation intensity of the ultraviolet ray.

Figure 3A:
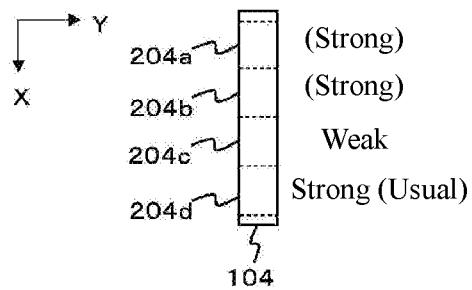
FIGS. 3A to 3D are views describing a light amount of an ultraviolet ray irradiated in each path.

FIGS. 3A to 3D are views describing the light amount of the ultraviolet ray irradiated in each path. FIG. 3A shows one example of a setting of the light amount of the ultraviolet ray irradiated in each path in the present example. As shown in the figure, in the present example, the light amount of the ultraviolet ray irradiated in each path is adjusted by changing the irradiation intensity of the plurality of regions 204*a* to 204*d* set in correspondence with each path in the ultraviolet light source 104.

More specifically, in the present example, at least the intensity of the ultraviolet ray irradiated from the region 204*d* corresponding to the last path is made strong, and the intensity of the ultraviolet ray irradiated from the region 204*c* corresponding to the path second to last is made weak. In this case, the ultraviolet ray with a strong intensity irradiated from the region 204*d* is, for example, an ultraviolet ray with intensity irradiated at a usual setting in the ultraviolet light source 104. Furthermore, the intensity irradiated at the usual setting in the ultraviolet light source 104 is, for example, a standard intensity set in advance. Moreover, the ultraviolet ray with a weak intensity irradiated from the region 204*c* is, for example, an ultraviolet ray with intensity weaker than the ultraviolet ray irradiated from the region 204*d*. In this case, the intensities of the ultraviolet rays irradiated from the other regions 204*a* and 204*b* in the ultraviolet light source 104 are set to standard strong intensities, for example, similar to the region 204*d*.

According to such configuration, for example, of the plurality paths carried out to form one layer of ink, the irradiation intensity of the ultraviolet ray in the last path is set to the usual strong intensity, and then the intensity of the ultraviolet ray in the path second to last, that is, the path immediately before the last path can be set weak. Thus, for example, the light amount of the ultraviolet ray irradiated in the path second to last can be made smaller than the light amount of the ultraviolet ray irradiated in the last path.

In this case, the light amount of the ultraviolet ray irradiated in the path second to last is preferably set to the light amount at which a state of the ink discharged in the relevant path becomes a state in which the shape changes when the ink is brought into contact with the flattening roller 106 (see FIGS. 1A to 1C). The state in which the shape changes when the ink is brought into contact with the flattening roller 106 is, for example, a state in which deformation can occur by the contact. Furthermore, curing the ink to such an extent that the deformation can occur means, for example, curing the ink to a temporarily cured (half cured) state having fluidity of such an extent that scraping can be carried out with the flattening roller 106. Such state is, for example, a state of the liquid with high viscosity.

In such configuration, for example, the ink discharged in the third path can maintain a state in which the ink is not completely cured at a timing of carrying out flattening in the fourth path. Thus, at the time of execution of the fourth path, other than the uncured ink discharged in the relevant path, the ink discharged in the third path is in a state in which the scraping can be carried out with the flattening roller 106.

In this case, for example, even if the shift in the height of the ink occurred as described above in relation to FIG. 2D and the height of the ink went beyond the flattening line at any position at the time point the third path is completed, the completely cured ink and the flattening roller 106 are not brought into contact. Even if the ink discharged in the third path is brought into contact with the flattening roller 106, the ink can be scraped off with the flattening roller 106 simultaneously with the ink discharged in the fourth path. Thus, according to such configuration, for example, production of scrape residue by the contact of the cured ink and the flattening roller 106, vibration of the flattening roller 106 by the contact, influence on the operation of flattening, and the like can be appropriately prevented.

In this case, it can be considered that if the ink discharged in the third path is cured to such an extent that deformation can occur when the ink is brought into contact with the flattening roller 106, the dot gain of the ink can be increased and the height of the ink can be lowered by such amount with elapse of time until flattening is carried out with the flattening roller 106 in the fourth path. Furthermore, in this case, for example, at least part of the ink landed on the position that is already made high is moved to a lower position, and thus the height of the ink may become lower than immediately after the landing before carrying out flattening in the fourth path. In such cases, even if the height of the ink is high immediately after the ink is discharged in the third path, the ink discharged in the third path and the flattening roller 106 can be made difficult to contact each other at the time point of carrying out flattening.

Therefore, according to the present example, for example, the occurrence of the problem that arises when the height of the ink discharged in the path before carrying out flattening becomes high can be appropriately suppressed. Furthermore, the flattening by the flattening roller 106 thus can be appropriately carried out at higher precision, and the 3D object can be more appropriately shaped at higher precision.

Thus, as described above, the light amount of the ultraviolet ray irradiated in the third path of the fourth paths carried out to form one layer of ink is made smaller than the other paths in the present example. Considering such feature in a more generalized manner, a comparison of the light amount of the ultraviolet ray irradiated in each path can be considered by comparing the unit area light amount of the ultraviolet ray. In this case, the unit area light amount is, for example, an integrated light amount of the ultraviolet ray irradiated from the ultraviolet light source 104 per unit area in one main scanning operation with respect to the region to which the ultraviolet curing type ink to become the material of shaping is discharged. Furthermore, when the ultraviolet light source 104 is arranged on both sides in the main scanning direction with respect to the arrangement of the inkjet heads as in the present example, the integrated light amount of the ultraviolet ray is the integrated light amount of the ultraviolet ray irradiated from the ultraviolet light source 104 on the back side of the arrangement of the inkjet heads in the moving direction of the inkjet head in each main scanning operation.

When the unit area light amount is considered as above, the feature of the present example can be considered as, for example, a configuration of making the unit area light amount in some main scanning operations smaller than the unit area light amount in other main scanning operations in the plurality of main scanning operations carried out with respect to each position in the plane orthogonal to the layering direction. In this case, for example, consideration is made to reducing the irradiation amount of the ultraviolet ray in some main scanning operations, so that the ultraviolet curing type ink is not completely cured. Furthermore, in this case, reducing the unit area light amount in the main scanning operation means, for example, making the ultraviolet ray irradiated to each position in the relevant main scanning operation weaker than in the other main scanning operations. Moreover, reducing the unit area light amount in the main scanning operation may be, for example, not irradiating the ultraviolet ray to each position in the relevant main scanning operation.

Furthermore, in this case, the unit area light amount in some paths is considered to be smaller than the unit area light amount in other paths in the plurality of paths carried out to form one layer of ink through the multi-path method. In this case, the flattening roller 106 flattens the layer at least in the last path of the plurality of paths carried out to form each layer.

Furthermore, in this case, at the time of the formation of at least some layers, the unit area light amount in at least the path second to last is considered to be smaller than the unit area light amount in the last path in the plurality of paths carried out to form the respective layers, as described above using FIG. 3A. In this case, for example, the unit area light amount in at least the last path is preferably made sufficiently large so as to sufficiently cure the layer of ink. According to such configuration, for example, the layer after the flattening can be more reliably cured. In this case, in the path second to last, consideration is made to curing the ink to such an extent that deformation can occur when the ink is brought into contact with the flattening roller 106, as described above. According to such configuration, for example, it is possible to appropriately prevent the cured ink from being scraped off and residues and the like from being produced, as described above.

Furthermore, in a variant of the manner of irradiating the ultraviolet ray, consideration is also made to reducing the unit area light amount in the path other than the second to last. In this case, for example, consideration is made to not completely curing the ink in some paths, so that the dot gain can be increased and the height of the ink can be lowered by such amount for the dots of the ink formed in the relevant path. According to such configuration, for example, the formation of a portion where the height in the layering direction becomes locally high can be appropriately prevented.

In this case, for example, consideration is also made to not completely curing the ink in any of the few paths other than the path for carrying out flattening to have the ink in a state with some fluidity at which the ink can move to a certain extent after landing. In such configuration, for example, the ink that landed on a locally high position is considered to easily move to a lower position by gravity. As a result, the amount of ink that is further overlapped on the locally high position can be reduced. Thus, even in such case, for example, a region that becomes locally high beyond the design height is unlikely to form. Furthermore, for example, the contact between the cured ink and the flattening roller 106 can be appropriately prevented.

Furthermore, in this case, consideration is made to making the unit area light amount in the first path smaller than in the last path in the plurality of paths carried out to form the respective layers. In this case, the first path is a first path in the operation of forming one layer. Furthermore, the first path in the operation of forming one layer is a path immediately after the path for carrying out flattening when the layer one below is formed. Moreover, the last path is the last path in the operation of forming the relevant layer. In this case, the last path is the path for carrying out flattening when the relevant layer is formed.

Figure 3B:
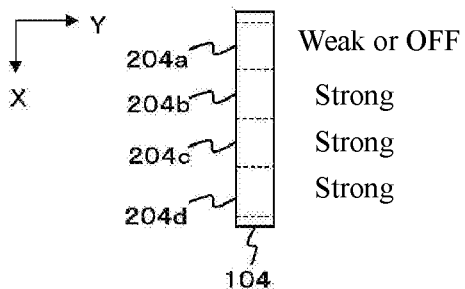

FIG. 3B is a view showing a variant of the manner of irradiating the ultraviolet ray, and shows one example of a setting of the light amount of the ultraviolet ray irradiated in each path for the case when the unit area light amount in the first path is reduced at the time of forming at least some layers of ink. In the figure, in this case, for example, the intensity of the ultraviolet ray irradiated from the region 204a corresponding to the first path (first path) of the regions 204a to 204d corresponding to each path in the ultraviolet light source 104 is made weak. The unit area light amount of the ultraviolet ray irradiated in the first path, for example, is thereby reduced.

In this case, making the intensity of the ultraviolet ray irradiated from the region 204a weak means, for example, making the intensity of the ultraviolet ray irradiated from the region 204a weaker than the intensity of the ultraviolet ray irradiated from at least the region 204d. In this case, for example, the unit area light amount of the ultraviolet ray irradiated in the first path may be reduced by not carrying out the irradiation of the ultraviolet ray from the region 204a and realizing the OFF state. As shown in the figure, in this case, for example, the ultraviolet ray with strong intensity is irradiated from the other regions 204b to 204d.

Figure 3C:
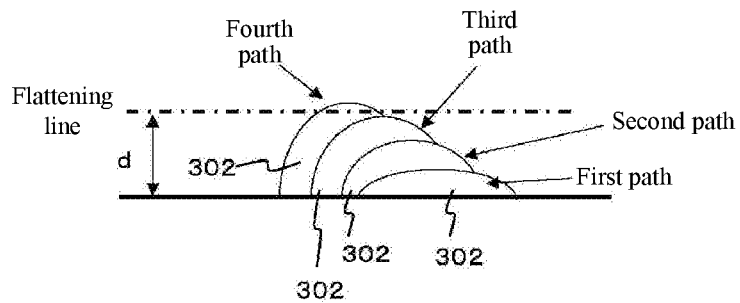

FIG. 3C schematically shows one example of a state of a dot 302 of an ink formed in each path when a unit area light amount in the first path is reduced. In this case, consideration is made that by weakening the ultraviolet ray irradiated in the first path, the dot 302 of the ink formed in the first path becomes a glossy form in a wet state and in a further spread state compared to when, for example, a strong ultraviolet ray is irradiated. In this case, as the dot 302 further spreads, the height of the dot 302 becomes lower. As a result, the height of the dot 302 of the ink formed after the second path also becomes lower by the amount the dot 302 of the first path underneath being lowered. Thus, according to such configuration, for example, formation of a region that becomes locally high in the layer of ink can be appropriately suppressed.

More specifically, in this case, the height of the dot 302 formed in the third path, which is the path immediately before carrying out flattening, for example, also becomes low compared to when the strong ultraviolet ray is irradiated in all the paths. Thus, according to such configuration, for example, the height of the dot 302 of the ink formed in the path immediately before carrying out flattening can be appropriately prevented from going beyond the flattening line. Furthermore, the contact between the cured ink and the flattening roller 106, and the like thus can be appropriately prevented.

Moreover, in this case, the first path carried out when the respective layers is formed is the path carried out immediately after carrying out flattening of the layer below. Thus, in the first path, the ink is landed on a flat region. When the dot of the ink is formed on the flat region, the dot of the ink can be more appropriately spread. Thus, if the ultraviolet ray irradiated in the first path is made weak, the dot 302 of the ink can be more appropriately spread and the height of the ink can be more appropriately lowered compared to, for example, when the ultraviolet ray is made weak in the other paths.

Focusing on a point of lowering the height of the dot 302 of the ink by weakening the ultraviolet ray, the ultraviolet ray is not necessarily weakened in the first path and the ultraviolet ray may be weakened in other paths. Furthermore, in this case, the path for reducing the unit area light amount is preferably selected from the paths other than the path for carrying out flattening with the flattening roller 106. Moreover, in this case, the unit area light amount of the ultraviolet ray may be set to zero in the path for reducing the unit area light amount, as described above.

Looking from only the standpoint of making the shift in the height of the ink formed in the path before carrying out flattening unlikely to occur, for example, the ultraviolet ray may be weakened in more paths. However, if the number of paths for weakening the ultraviolet ray to be irradiated is increased in excess, for example, the curing of the ink may become insufficient in the entire layer of ink or the entire 3D object. Thus, the proportion of the path for weakening the ultraviolet ray to be irradiated is preferably not too large. More specifically, for example, it is preferable to have only one path of the plurality of paths carried out to form the respective layers. In other words, in this case, for example, the unit area light amount in only one path of the plurality of paths carried out to form the respective layers is preferably made smaller than the unit area light amount in the other plurality of paths when at least some layers are formed. Furthermore, for example, the unit area light amount is preferably made the same for the other plurality of paths.

Having the same unit area light amount for the other plurality of paths, for example, means having the unit area light amount substantially the same according to the precision, and the like of the operation of the ultraviolet light source 104. In this case, the unit area light amount in the other plurality of paths is preferably set to the unit area light amount of when the standard strong ultraviolet ray is irradiated. According to such configuration, for example, the curing of the ink can be appropriately prevented from becoming insufficient for the entire layer or for the entire 3D object.

Moreover, the unit area light amount of the ultraviolet ray may be set to zero in the path for reducing the unit area light amount, as described above. In this case, consideration is made to shifting the position of the ultraviolet light source 104 and the position of the inkjet head 102 in the sub-scanning direction, and arranging the ultraviolet light source 104 while avoiding a region of part of the inkjet head 102 and a position adjacent in the main scanning direction.

Figure 3D:
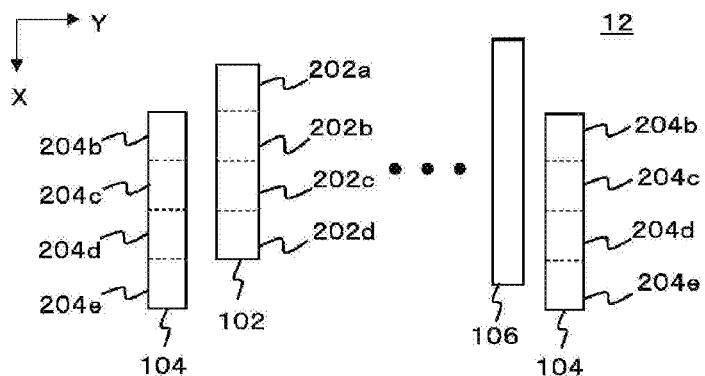

FIG. 3D is a view describing a configuration of the head unit 12 when the position of the ultraviolet light source 104 and the position of the inkjet head 102 are shifted in the sub-scanning direction, and shows one example of the configuration of the head unit 12 for the case when the ultraviolet ray is not irradiated in the first path and the unit area light amount of the ultraviolet ray is set to zero. In this case, for example, consideration is made to arranging the ultraviolet light source 104 so as to avoid a position overlapping in the sub-scanning direction with the region 202a corresponding to the first path in the inkjet head 102.

More specifically, the ultraviolet light source 104 does not include a region that overlaps in the sub-scanning direction with the region 202a of the inkjet head 102 in the illustrated configuration. Furthermore, the ultraviolet light source 104 is set with a plurality of regions 204b to 204d at positions overlapping in the sub-scanning direction with the regions 202b to 202d corresponding to the second to fourth paths in the inkjet head 102, and further set with a region 204e on the outer side thereof. In this case, in each main scanning operation, each of the plurality of regions 204b to 204d irradiates the ultraviolet ray on the ink discharged from the nozzle arranged in each of the plurality of regions 202b to 202d of the inkjet head 102 and landed on the surface-to-be-shaped. The region 204e is a region for further carrying out finishing ultraviolet irradiation after the fourth path, where the ultraviolet ray is further irradiated in the next main scanning operation with respect to the portion in which the main scanning operations up to the fourth path are completed in the surface-to-be-shaped of the 3D object.

In such configuration, formation of a region that becomes locally high in the layer of ink can be appropriately suppressed by, for example, setting the unit area light amount in the first path to zero. Furthermore, the contact between the cured ink and the flattening roller 106, and the like thus can be appropriately prevented. In this case, the layer of ink can be more reliably cured by carrying out the irradiation of the ultraviolet ray from the region 204e of the ultraviolet light source 104.

Next, a supplementary explanation and further variants related to the features in the present example will be described. As described above, in the present example, the UVLED can be suitably used for the ultraviolet light source 104. In this case, at least one or more UVLEDs are preferably arranged in each of the plurality of regions 204a to 204d in the ultraviolet light source 104. According to such configuration, for example, the intensity of the ultraviolet ray irradiated from each region 204a to 204d can be appropriately adjusted by adjusting the power to supply to the UVLED of each region. In this case, the intensity of the ultraviolet ray, for example, can be more easily and appropriately adjusted by using the UVLED.

In the description made above, a case of setting the distance, obtained by dividing the nozzle row length of the inkjet head by the number of paths, for the feeding amount in the sub-scanning direction has been mainly described using FIGS. 2A to 2D and the like as for the operation of the multi-path method. However, an operation other than that described above may be used for the operation of the multi-path method. More specifically, for example, consideration can be made to using the operation of a small pitch multi-path method, which is the method of setting the feeding amount in the sub-scanning direction between the main scanning operations for the number of paths to a small pitch, and the like.

Figure 4A:
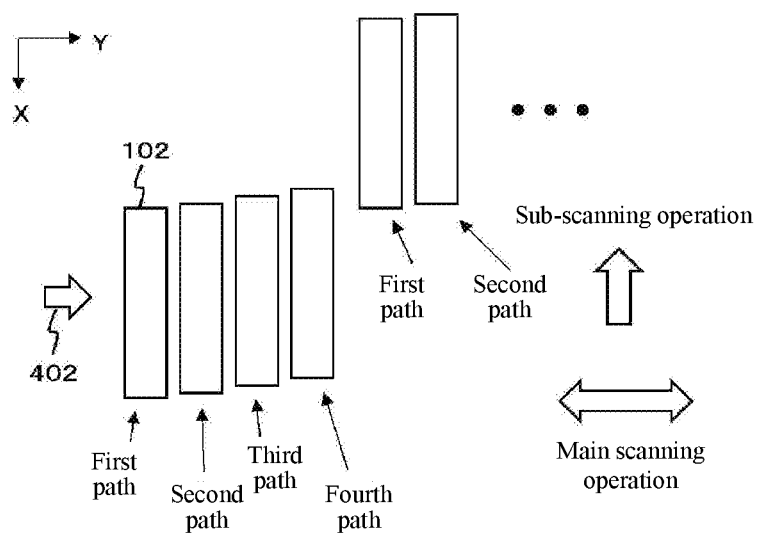
FIGS. 4A and 4B show one example of an operation of a small pitch multi-path method.
Figure 4B:
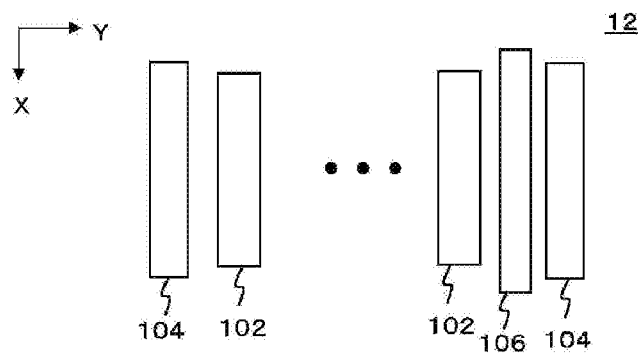

FIGS. 4A and 4B are views showing one example of an operation of the small pitch multi-path method, and shows one example of the operation of when the number of paths is four (four paths). Excluding the points described below, the configuration denoted with the same reference number as FIGS. 1A to 3D in FIGS. 4A and 4B may have features same as or similar to the configuration in FIGS. 1A to 3D.

FIG. 4A is a view describing the position of the inkjet head 102 in each path of the small pitch multi-path method, and shows one example of the position in the sub-scanning direction of one inkjet head 102 in each path for the case when the operation of the small pitch multi-path method in the four paths is carried out. When the operation of the small pitch multi-path method in four paths is carried out, four main scanning operations (paths), which is the number of paths, are carried out with respect to each position when one layer of ink is formed, as shown in the figure. In this case, the main scanning operations of the first to fourth paths are carried out at the same time with respect to a region corresponding to the entire inkjet head 102 as indicated with the arrow 402. The sub-scanning operation in the feeding amount of small pitch is carried out between each main scanning operation of the first to fourth paths.

In this case, the small pitch is, for example, a distance smaller than the distance obtained by dividing the nozzle row length of the inkjet head 102 by the number of paths.

More specifically, for example, consideration can be made to having the small pitch to smaller than or equal to about a few times the nozzle interval (nozzle pitch) (e.g., smaller than or equal to ten times the nozzle interval) in the nozzle row of the inkjet head. Such small pitch may be, for example, a distance (e.g., ½ of nozzle interval) of smaller than the nozzle interval. Furthermore, consideration is also made to setting the small pitch to a distance obtained by adding the integral multiples of the nozzle pitch (e.g., one to ten times the nozzle pitch) and the distance smaller than the nozzle interval (e.g., ½ of the nozzle interval).

In the small pitch multi-path method, the sub-scanning operation in a greater feeding amount is carried out, as necessary, after carrying out the main scanning operation for the number of paths. More specifically, for example, when the width in the sub-scanning operation of the 3D object to be shaped is greater than the nozzle row length of the inkjet head, consideration is made to carrying out the sub-scanning operation in such large feeding amount.

Furthermore, in the sub-scanning operation in the large feeding amount, for example, the feeding amount is set so as to shift the position of the inkjet head 102 in the sub-scanning direction by the nozzle row length from the position where the main scanning operation for the number of paths is carried out immediately before. In this case, for example, consideration is made to setting a large feeding amount so that the total feeding amount in the sub-scanning direction carried out after the first path in the main scanning operation for the number of paths carried out immediately before becomes equal to the nozzle row length. The first path in the main scanning operation for the number of paths carried out immediately before is the main scanning operation carried out immediately after the previous sub-scanning operation in the large feeding amount. Moreover, consideration can also be made to, for example, setting the large feeding amount so that a difference between the position of the inkjet head in the first path of the previous time and the position of the inkjet head in the first path carried out next becomes equal to the nozzle row length for the relative position in the sub-scanning direction with respect to the 3D object. Even in the above configuration, for example, the shaping in the multi-path method can be appropriately carried out.

FIG. 4B is a view describing a manner of irradiating the ultraviolet ray when shaping is carried out in the small pitch multi-path method, and shows one example of a configuration of the head unit 12 in a simplified manner. When the shaping of the 3D object is carried out in the small pitch multi-path method as well, the head unit 12 having the same configuration as the case described using FIGS. 1A to 3D can be used for the head unit 12. More specifically, in this case as well, the head unit 12 includes the plurality of ultraviolet light sources 104, similar to the case described using FIG. 1B, and the like. Furthermore, each of the plurality of ultraviolet light sources 104 is arranged at each of one end side and another end side in the main scanning direction in the head unit 12 so as to sandwich the arrangement of the inkjet heads 102 therebetween. Furthermore, the head unit 12 includes the flattening roller 106 between the inkjet head 102 and the ultraviolet light source 104 at one side of the arrangement of the inkjet heads 102.

In this case, the intensity of the ultraviolet ray irradiated from the entire ultraviolet light source 104 becomes the intensity of the ultraviolet ray irradiated in each path. In other words, in this case, the unit area light amount of the ultraviolet ray irradiated in each path is commonly set with respect to the entire nozzle row rather than being set for every region of the nozzle row of the inkjet head. According to such configuration, for example, the unit area light amount of the ultraviolet ray irradiated in each path can be appropriately set when the small pith multi-path method is used.

In this case as well, the unit area light amount can be set small for some paths by setting the intensity of the ultraviolet ray irradiated from the entire ultraviolet light source 104 for every path. More specifically, for example, consideration is made to reducing the unit area light amount of the third path, similar to the case described using FIGS. 1A to 3D. According to such configuration, for example, it is possible to appropriately prevent the cured ultraviolet curing type ink from being scraped off and the residues and the like from being produced. Furthermore, the third path is not the only case, and the unit area light amount can be reduced in any of the first to third paths to appropriately suppress the formation of the region that becomes locally high in the layer of ink. Thus, even when the small pitch multi-path method is used, the 3D object can be more appropriately shaped at higher precision by reducing the unit area light amount in some paths.

In each configuration described above, the curing state of the ink discharged in the previous paths is controlled at the timing of carrying out flattening in the last path for forming one layer by controlling the manner of irradiating the ultraviolet ray in each path. Furthermore, for example, occurrence of the problem due to the contact between the cured ink and the flattening roller 106 is suppressed.

Considering such feature in a more generalized manner, for example, consideration can be made to differing the manner of forming the dots of the ink in some main scanning operations from the manner of forming the dots in the other main scanning operations in the plurality of main scanning operations carried out with respect to each position of the 3D object. In this case, for example, the specific dot of the same state can be prevented from being formed in an excessively overlapping manner by differing the manner of forming the dots in some main scanning operations. Thus, according to such configuration, for example, the problem that occurs if the main scanning operation is merely carried out under the same conditions can be appropriately suppressed from arising. The 3D object thus can be more appropriately shaped at higher precision.

In this case, other than the method of controlling the manner of irradiating the ultraviolet ray in each path, for example, consideration is made to making the amount of ink discharged per unit area in one main scanning operation smaller than in other main scanning operations in some main scanning operations. In such configuration, for example, the dots of the ink can be formed in a more stable state by forming the dots of the ink at a lower density in some main scanning operations than at the time of other main scanning operations. Thus, according to such configuration, for example, the state of the layer of ink can be appropriately adjusted in some main scanning operations. The specific dot of the same state thus can be appropriately prevented from being formed in an excessively overlapping manner.

Furthermore, the method of differing the manner of forming the dots can be considered as differing the diameter (dot size) of the dot of the ink formed in some main scanning operations from the other main scanning operations. In this case, for example, consideration is made to differing the capacity (discharging volume) of the ink discharged from the nozzle in the operation of one discharge. Furthermore, consideration is also made to differing the diameter of the dot, and the like by changing the time (delay time) from when the ink landed on the surface-to-be-shaped until the ultraviolet ray is irradiated thereon.

Moreover, consideration is also made to differing not the feature of the individual dot itself but the feature of the arrangement of the dots as a method of differing the manner of forming the dot. In this case, for example, the density of the dot to be formed is differed in some main scanning operations from the other main scanning operations. More specifically, in this case, consideration is made to differing the interval of the dots formed in a certain main scanning operation from the other main scanning operations in some main scanning operations.

The method of controlling the manner of irradiating the ultraviolet ray in each path is not limited to the method described above, and consideration is also made to using various methods. In this case, for example, the irradiation time of the ultraviolet ray in some main scanning directions is differed from the other main scanning operations. More specifically, in this case, for example, consideration is made to adjusting the irradiation time of the ultraviolet ray by changing the number of rows to light up using a plurality of rows of light sources lined in the main scanning direction. Furthermore, for example, consideration is also made to adjusting the irradiation time of the ultraviolet ray, and the like by changing the moving speed (scan speed) at the time of the main scanning operation.

Moreover, consideration is also made to controlling the manner of irradiating the ultraviolet ray in each path, and the like by changing the power (e.g., input current) to supply to the light source such as the UVLED. Consideration is also made to controlling the manner of irradiating the ultraviolet ray in each path, and the like by changing the irradiation distance of the ultraviolet ray. In this case, for example, consideration is made to changing the interval between the surface-to-be-shaped and the light source using a mechanism for moving the light source of the ultraviolet ray up and down in the layering direction.

INDUSTRIAL APPLICABILITY

The present disclosure can be suitably used for, for example, the shaping device.

What is claimed is:

1. A shaping device that shapes a 3D object, the shaping device comprising: a discharging head that discharges an ultraviolet curing ink, which cures according to irradiation of an ultraviolet ray, as a material of shaping; an ultraviolet light source that irradiates the ultraviolet ray for curing the ultraviolet curing ink; a main scanning driving unit that causes the discharging head to carry out a main scanning operation of discharging the ultraviolet curing ink while relatively moving with respect to the 3D object in a main scanning direction set in advance; a layering direction driving unit that relatively moves the discharging head with respect to the 3D object in a layering direction being a direction in which the ultraviolet curing ink is layered; a flattening unit that flattens a layer formed with the ultraviolet curing ink; and a controller configured to control operations of the discharging head, the ultraviolet light source, the main scanning driving unit, the layering direction driving unit, and the flattening unit to execute an operation of shaping carried out by layering the ultraviolet curing ink in the layering direction, wherein the controller causes the discharging head to carry out the main scanning operation for plural times with respect to the same horizontal level for forming a single unit layer with the ultraviolet curing ink in a plane orthogonal to the layering direction, wherein the plurality of main scanning operations traversing across the layer formed with the ultraviolet curing ink are performed on the same horizontal level in a sequential order, and each of the plurality of main scanning operations is performed along a discharging path correspondingly, wherein a portion of a discharging path of a subsequent one of the main scanning operations is overlapped with a discharging path of a previous one of the main scanning operations performed before the subsequent one of the main scanning operations, and the remaining portion of the discharging path of the subsequent one of the main scanning operations is aligned with the discharging path of the previous one of the main scanning operations with respect to the same horizontal level, wherein scanning directions of the subsequent one of the main scanning operations and the previous one of the main scanning operations are opposite to each other, and when an integrated light amount of the ultraviolet ray irradiated from the ultraviolet light source per unit area in one of the plurality of main scanning operations with respect to a region to which the ultraviolet curing ink is discharged is defined as a unit area light amount, the unit area light amount in some of the plurality of main scanning operations is made smaller than the unit area light amount in the other main scanning operations in the plurality of main scanning operations carried out with respect to the same horizontal level for forming the single unit layer and irradiation occurs during each of the plurality of main scanning operations, wherein the 3D object is shaped through a layering and shaping method by layering a plurality of unit layers formed with the ultraviolet curing ink, each of the unit layers being formed through the plurality of main scanning operations with respect to the same horizontal level, and when flattening is not carried out by the flattening unit, a first predetermined height of the unit layers is reached before forming a last layer, and a second predetermined height of the unit layers is reached after completion of the last layer, wherein when the flattening is applied, a thickness of the unit layers after the flattening is set to be higher than the first predetermined height and lower than the second predetermined height.

2. The shaping device according to claim 1, wherein the flattening unit flattens the layer in at least a last main scanning operation of the plural times of main scanning operations carried out to form each layer when at least some unit layers are formed.

3. The shaping device according to claim 2, wherein when at least some unit layers are formed, the unit area light amount in at least the main scanning operation second to last is made smaller than the unit area light amount in the last main scanning operation in the plural times of main scanning operations carried out to form each layer.

4. The shaping device according to claim 3, wherein
the flattening unit is a roller that flattens the layer by scraping off the ultraviolet curing ink, and
the unit area light amount in the main scanning operation second to last is set to a light amount at which a state of the ultraviolet curing ink discharged in a relevant main scanning operation becomes a state in which a shape of the ink changes when the ink is brought into contact with the roller.

5. The shaping device according to claim 1, wherein when at least some unit layers are formed, the unit area light amount in a first main scanning operation is made smaller than the unit area light amount in a last main scanning operation in the plural times of main scanning operations carried out to form each layer.

6. The shaping device according to claim 1, wherein when at least some unit layers are formed, the unit area light amount in only one main scanning operation is made smaller than the unit area light amount in the other plural times of main scanning operations in the plural times of main scanning operations carried out to form each layer, and the unit area light amount is set the same for the other plural times of main scanning operations.

7. The shaping device according to claim 2, wherein when at least some unit layers are formed, the unit area light amount in a first main scanning operation is made smaller than the unit area light amount in the last main scanning operation in the plural times of main scanning operations carried out to form each layer.

8. The shaping device according to claim 3, wherein when at least some unit layers are formed, the unit area light amount in a first main scanning operation is made smaller than the unit area light amount in the last main scanning operation in the plural times of main scanning operations carried out to form each layer.

9. The shaping device according to claim 4, wherein when at least some unit layers are formed, the unit area light amount in a first main scanning operation is made smaller than the unit area light amount in the last main scanning operation in the plural times of main scanning operations carried out to form each layer.

10. The shaping device according to claim 2, wherein when at least some unit layers are formed, the unit area light amount in only one main scanning operation is made smaller than the unit area light amount in the other plural times of main scanning operations in the plural times of main scanning operations carried out to form each layer, and the unit area light amount is set the same for the other plural times of main scanning operations.

11. The shaping device according to claim 3, wherein when at least some unit layers are formed, the unit area light amount in only one main scanning operation is made smaller than the unit area light amount in the other plural times of main scanning operations in the plural times of main scanning operations carried out to form each layer, and the unit area light amount is set the same for the other plural times of main scanning operations.

12. The shaping device according to claim 4, wherein when at least some unit layers are formed, the unit area light amount in only one main scanning operation is made smaller than the unit area light amount in the other plural times of main scanning operations in the plural times of main scanning operations carried out to form each layer, and the unit area light amount is set the same for the other plural times of main scanning operations.

13. The shaping device according to claim 5, wherein when at least some unit layers are formed, the unit area light amount in only one main scanning operation is made smaller than the unit area light amount in the other plural times of main scanning operations in the plural times of main scanning operations carried out to form each layer, and the unit area light amount is set the same for the other plural times of main scanning operations.

14. A shaping device that shapes a 3D object, the shaping device comprising: a discharging head that discharges an ultraviolet curing ink, which cures according to irradiation of an ultraviolet ray, as a material of shaping, wherein the discharging head has a plurality of ink discharging regions set therein, the plurality of ink discharging regions respectively corresponds to a plurality of discharging paths; an ultraviolet light source that irradiates the ultraviolet ray for curing the ultraviolet curing ink, wherein the ultraviolet light source has a plurality of light irradiation regions set therein, each of the plurality of light irradiation regions is respectively set corresponding to the plurality of ink discharging regions, and each of the plurality of light irradiation regions has different irradiation intensities of the ultraviolet ray; a main scanning driving unit that causes the discharging head to carry out a main scanning operation of discharging the ultraviolet curing ink while relatively moving with respect to the 3D object in a main scanning direction set in advance; a layering direction driving unit that relatively moves the discharging head with respect to the 3D object in a layering direction being a direction in which the ultraviolet curing ink is layered; a flattening unit that flattens a layer formed with the ultraviolet curing ink; and a controller configured to control operations of the discharging head, the ultraviolet light source, the main scanning driving unit, the layering direction driving unit, and the flattening unit to execute an operation of shaping carried out by layering the ultraviolet curing ink in the layering direction, wherein the controller causes the discharging head to carry out the main scanning operation for plural times with respect to the same horizontal level for forming a single unit layer with the ultraviolet curing ink in a plane orthogonal to the layering direction, wherein the plurality of main scanning operations traversing the layer formed with the ultraviolet curing ink are performed on the same horizontal level in a sequential order, and each of the plurality of main scanning operations is performed along one of the plurality of discharging paths correspondingly, wherein a portion of one of the discharging paths of a subsequent one of the main scanning operations is overlapped with one of the discharging paths of a previous one of the main scanning operations performed before the subsequent one of the main scanning operations, and the remaining portion of the one of the discharging paths of the subsequent one of the main scanning operations is aligned with the one of the discharging paths of the previous one of the main scanning operations with respect to the same horizontal level, wherein scanning directions of the subsequent one of the main scanning operations and the previous one of the main scanning operations are opposite to each other, and a manner of forming a dot of the ultraviolet curing ink in some main scanning operations is differed from a manner of forming a dot of the ultraviolet curing ink in the other main scanning operations in irradiation light amounts applied to the light irradiation regions thereof in the plurality of main scanning operations carried out with respect to the same horizontal level and irradiation occurs during each main scanning operation.

\* \* \* \* \*